(12) United States Patent
Kwok

(10) Patent No.: US 11,152,800 B2
(45) Date of Patent: Oct. 19, 2021

(54) SYSTEMS AND METHODS FOR CHARGING A BATTERY

(71) Applicant: Caterpillar Inc., Deerfield, IL (US)

(72) Inventor: Wellington Kwok, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 276 days.

(21) Appl. No.: 16/397,518

(22) Filed: Apr. 29, 2019

(65) Prior Publication Data
US 2020/0343743 A1  Oct. 29, 2020

(51) Int. Cl.
*H02J 7/00* (2006.01)
*B60L 58/12* (2019.01)

(52) U.S. Cl.
CPC ............ *H02J 7/0029* (2013.01); *H02J 7/007* (2013.01); *B60L 58/12* (2019.02); *H02J 7/00302* (2020.01)

(58) Field of Classification Search
CPC ...... H02J 7/007; H02J 7/0029; H02J 7/00302; H02J 7/0073; H02J 7/0093
USPC ........ 320/125, 132, 139, 146, 141, 145, 157
See application file for complete search history.

(56) References Cited

U.S. PATENT DOCUMENTS

| | | |
|---|---|---|
| 5,828,202 A | 10/1998 | Tamai |
| 6,707,272 B1 | 3/2004 | Thandiwe |
| 8,890,486 B2 | 11/2014 | Xiao |
| 2008/0203969 A1* | 8/2008 | Kurihara ............... H02J 7/0022 320/116 |
| 2011/0266998 A1* | 11/2011 | Xiao ..................... H02J 7/0071 320/107 |
| 2012/0081068 A1* | 4/2012 | Odaohhara ............ H02J 7/045 320/107 |
| 2015/0377976 A1* | 12/2015 | Maluf .................. G01R 31/392 702/63 |

FOREIGN PATENT DOCUMENTS

| | | |
|---|---|---|
| CN | 106785141 A | 5/2017 |
| GB | 2290180 A | 12/1995 |

* cited by examiner

*Primary Examiner* — Edward Tso
*Assistant Examiner* — Aaron Piggush
(74) *Attorney, Agent, or Firm* — Harrity & Harrity LLP

(57) ABSTRACT

A device may cause constant voltage pulse charging of a battery by a battery charger. The device may determine a first voltage value associated with the battery and may cause, based on the first voltage value satisfying a voltage value threshold, the constant voltage pulse charging of the battery to pause for a first period of time. The device may determine, after the first period of time, a second voltage value associated with the battery and may cause, based on the second voltage value satisfying the voltage value threshold, the constant voltage pulse charging of the battery to pause for a second period of time. The device may determine, after the second period of time, a third voltage value associated with the battery and may cause, based on the third voltage value satisfying the voltage value threshold, the constant voltage pulse charging of the battery to cease.

20 Claims, 7 Drawing Sheets

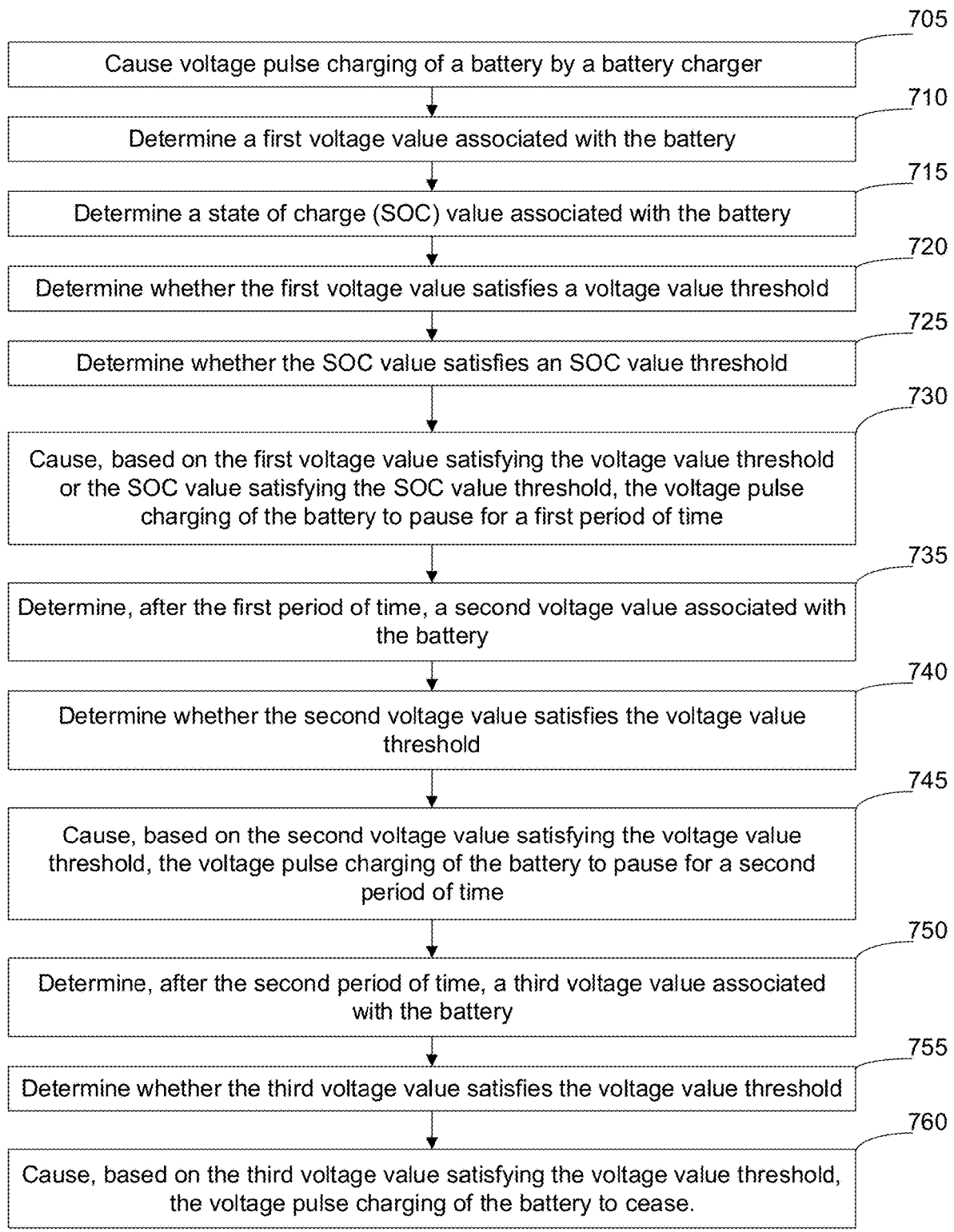

SYSTEMS AND METHODS FOR CHARGING A BATTERY

TECHNICAL FIELD

The present disclosure relates generally to charging a battery and, more particularly, to charging a battery using voltage pulse charging.

BACKGROUND

A battery charger may provide electrical energy to a battery to charge the battery. As the battery is charged by the battery charger, a voltage of the battery increases. The battery is fully charged when the battery has a voltage that matches a maximum operating voltage of the battery. The battery charger may use different charging techniques, such as a constant current charging technique, a constant voltage charging technique, and/or the like, to charge the battery. In some cases, a battery charger may provide constant voltage charging to the battery, where a setpoint voltage of the battery charger matches the maximum operating voltage of the battery. This enables the battery charger to fully charge the battery, while minimizing a risk of overcharging the battery. However, in some cases, a battery charger may provide constant voltage charging to the battery, where the setpoint voltage of the battery charger exceeds the maximum operating voltage of the battery. This increases a likelihood of overcharging the battery (e.g., increasing a voltage of the battery above the maximum operating voltage of the battery). Overcharging the battery may cause damage to the chemical composition of the battery, which may degrade performance of the battery and/or increase a likelihood of a battery fire.

One approach to charging a battery is disclosed in U.S. Pat. No. 5,828,202 that issued to Sanyo Electric Co., Ltd., on Oct. 27, 1998 ("the '202 patent"). In particular, the '202 patent discloses a battery apparatus has a circuit to turn off a switching device and suspend charging when rechargeable battery voltage exceeds a specified voltage, and to turn on the switching device and resume charging when rechargeable battery voltage drops below the specified voltage. The switching device is switched on and off to pulse charge the rechargeable battery. While the '202 patent may utilize a pulse charging method to ensure that a voltage of a battery does not drop below a specified voltage, the '202 patent does not disclose determining when or how to cease pulse charging the battery.

Accordingly, the battery charger controller of the present disclosure solves one or more of the problems set forth above and/or other problems in the art.

SUMMARY

According to some implementations, a method may include causing, by a device, constant voltage pulse charging of a battery by a battery charger; determining, by the device, a first voltage value associated with the battery; determining, by the device, whether the first voltage value satisfies a voltage value threshold; causing, by the device and based on the first voltage value satisfying the voltage value threshold, the constant voltage pulse charging of the battery to pause for a first period of time; determining, by the device and after the first period of time, a second voltage value associated with the battery; determining, by the device, whether the second voltage value satisfies the voltage value threshold; causing, by the device and based on the second voltage value satisfying the voltage value threshold, the constant voltage pulse charging of the battery to pause for a second period of time; determining, by the device and after the second period of time, a third voltage value associated with the battery; determining, by the device, whether the third voltage value satisfies the voltage value threshold; and causing, by the device and based on the third voltage value satisfying the voltage value threshold, the constant voltage pulse charging of the battery to cease.

According to some implementations, a device may include one or more memories; and one or more processors to: cause voltage pulse charging of a battery by a battery charger; determine a first voltage value associated with the battery; determine a state of charge (SOC) value associated with the battery; determine whether the first voltage value satisfies a voltage value threshold; determine whether the SOC value satisfies an SOC value threshold; cause, based on the first voltage value satisfying the voltage value threshold or the SOC value satisfying the SOC value threshold, the voltage pulse charging of the battery to pause for a first period of time; determine, after the first period of time, a second voltage value associated with the battery; determine whether the second voltage value satisfies the voltage value threshold; cause, based on the second voltage value satisfying the voltage value threshold, the voltage pulse charging of the battery to pause for a second period of time; determine, after the second period of time, a third voltage value associated with the battery; determine whether the third voltage value satisfies the voltage value threshold; and cause, based on the third voltage value satisfying the voltage value threshold, the voltage pulse charging of the battery to cease.

According to some implementations, a system may include a battery charger configured to charge a battery, wherein the battery charger includes a power supply and a resistor electrically coupled to the power supply; and a battery charger controller configured to: cause the battery charger to activate to perform constant voltage pulse charging of the battery; determine, based on causing the battery charger to activate to perform the constant voltage pulse charging of the battery, a first voltage value associated with the battery; determine whether the first voltage value satisfies a voltage value threshold; cause, based on the first voltage value satisfying the voltage value threshold, the battery charger to deactivate for a first period of time; determine, after the first period of time, a second voltage value associated with the battery; determine whether the second voltage value satisfies the voltage value threshold; cause, based on the second voltage value satisfying the voltage value threshold, the battery charger to deactivate for a second period of time; determine, after the second period of time, a third voltage value associated with the battery; determine whether the third voltage value satisfies the voltage value threshold; and cause, based on the third voltage value satisfying the voltage value threshold, the battery to disconnect from the battery charger.

BRIEF DESCRIPTION OF THE DRAWINGS

FIG. 7 is a flow chart of an example process for charging a battery.

DETAILED DESCRIPTION

Figure 1:
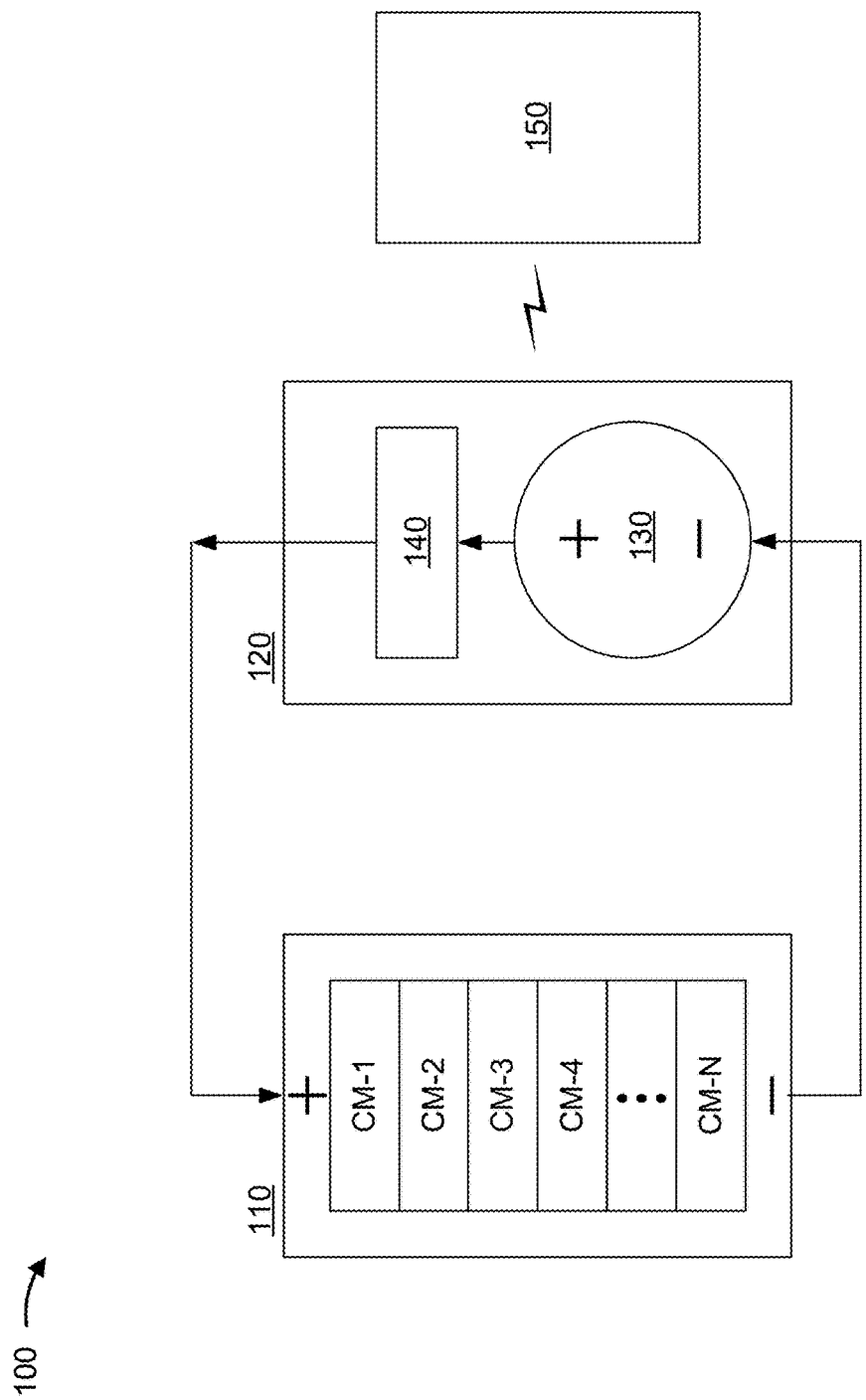
FIG. 1 is diagram of an example system for charging a battery described herein.

FIG. 1 is a diagram of an example system 100 for charging a battery described herein. System 100 includes a battery 110, a battery charger 120, and a battery charger controller 150. As shown in FIG. 1, battery 110 may include a plurality of cells (referred to individually as a "cell" and collectively as "cells") that are included within cell modules (shown as CM-1 to CM-N, where N is an integer and N≥1) (referred to individually as a "cell module" and collectively as "cell modules"). Battery charger 120 may include a power supply 130 and at least one resistor 140 (e.g., power supply 130 may be in series with resistor 140). As described herein, battery charger controller 150 may be configured to cause battery charger 120 to charge battery 110. For example, battery charger controller 150 may send one or more messages, signals, and/or the like to battery charger 120 to control battery charger 120 to charge battery 110. Battery charger 120 may send information concerning battery 110 to battery charger controller 150 to facilitate battery charger controller 150 determining a state of charge (SOC), a voltage, and/or the like of battery 110.

Battery 110 may be configured to suitably provide power for a machine (not shown). Such a machine may include mechanical machinery, a movable machine (e.g., a vehicle, such as a locomotive), and/or the like. Battery 110 may be used to provide electrical power to an electrically powered system of a movable machine, to start the movable machine, and/or cause movement of the movable machine. Such a movable machine may be an autonomous vehicle, a non-autonomous vehicle, a semi-autonomous vehicle, and/or the like. In some implementations, one or more components of system 100 may be located on such a machine. For example, battery charger controller 150 may be associated with and/or included within an electronic control unit (ECU) of the machine.

As indicated above, FIG. 1 is provided as an example. Other examples may differ from what is described in connection with FIG. 1

Figure 2:
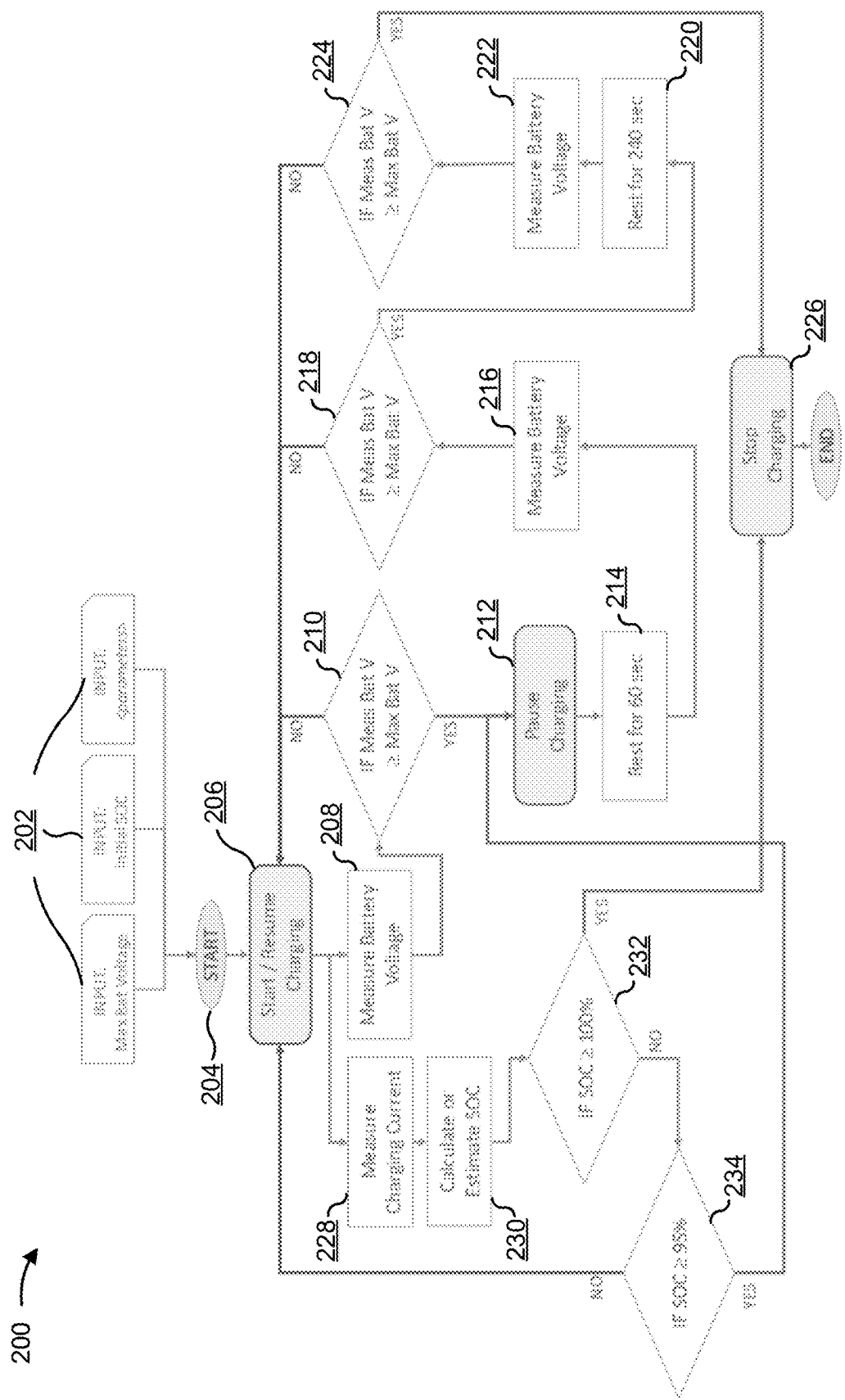
FIG. 2 is a flowchart of an example process for voltage pulse charging as described herein.

FIG. 2 is a flowchart of an example process 200 for voltage pulse charging as described herein. In some implementations, one or more process blocks of FIG. 2 may be performed by battery charger controller 150 alone or in combination with battery 110 and battery charger 120.

As shown by reference number 202, battery charger controller 150 may obtain one or more inputs to facilitate voltage pulse charging as described herein. For example, battery charger controller 150 may obtain a maximum operating voltage value associated with battery 110 (e.g., a maximum amount of voltage that battery 110 can safely store) from battery 110, battery charger controller 150, a different device, such as an ECU of the machine, and/or the like. As another example, battery charger controller 150 may obtain an initial SOC value associated with battery 110 (e.g., based on an ampere-hour capability value of battery 110) from battery 110, battery charger controller 150, a different device, such as an ECU of the machine, and/or the like. Battery charger controller 150 may cause battery charger 120 to interact with battery 110 to determine the initial SOC value associated with battery 110. Battery charger 120 may send the initial SOC value associated with battery 110 to battery charger controller 150.

As shown by reference numbers 204 and 206, battery charger controller 150 may cause charging of battery 110 to begin. For example, battery charger controller 150 may cause battery charger 120 to activate to charge battery 110. Battery charger controller 150 may cause battery charger 120 to charge battery 110 using a voltage pulse charging technique, such as a constant voltage pulse charging technique. Voltage pulse charging may include constant voltage pulse charging; variable voltage pulse charging; a combination of constant voltage charging, variable voltage charging, constant voltage pulse charging, and/or variable voltage pulse charging; and/or the like. For example, voltage pulse charging may include constant voltage charging for an amount of time and then constant voltage pulse charging after the amount of time.

In some implementations, battery charger controller 150 may cause battery charger 120 to perform constant voltage pulse charging of battery 110 at a voltage setpoint value. In some implementations, the voltage setpoint value may be greater than the maximum operating voltage value associated with battery 110.

As shown by reference number 208, battery charger controller 150 may cause battery charger 120 to measure a voltage of battery 110 for a first time. Battery charger controller 150 may determine a first voltage value associated with battery 110 by causing battery charger 120 to measure the voltage of battery 110 (e.g., by causing battery charger 120 to send a voltage measurement to battery charger controller 150). As shown by reference number 210, battery charger controller 150 may determine whether the first voltage value satisfies a voltage value threshold. Battery charger controller 150 may determine the voltage value threshold based on the maximum operating voltage value associated with battery 110 (e.g., the voltage value threshold may be the maximum operating voltage value, a percentage of the maximum operating voltage value (e.g., 95% of the maximum operating voltage value), and/or the like). Accordingly, in one example, when the voltage value threshold is equal to the maximum operating voltage value, battery charger controller 150 may determine whether the first voltage value associated with battery 110 is greater than or equal to the maximum operating voltage value of battery 110 to determine whether the first voltage value associated with battery 110 satisfies the voltage value threshold. When the battery charger controller 150 determines that the first voltage value associated with battery 110 does not satisfy the voltage value threshold (e.g., the first voltage value associated with battery 110 is less than the maximum operating voltage value of battery 110), battery charger controller 150 may cause battery charger 120 to resume charging of battery 110 (e.g., as shown by reference number 206).

As shown by reference numbers 212 and 214, when the battery charger controller 150 determines that the first voltage value associated with battery 110 satisfies the voltage value threshold (e.g., the first voltage value associated with battery 110 is greater than or equal to the maximum operating voltage value of battery 110), battery charger controller 150 may cause voltage pulse charging of battery 110 to pause for a first period of time (e.g., greater than 30 seconds and less than or equal to 60 seconds). Battery charger controller 150 may cause voltage pulse charging of battery 110 to pause for the first period of time by causing battery charger 120 to deactivate for the first period of time. Battery charger controller 150 may determine the first period of time based on at least one property of battery 110. For example, battery charger controller 150 may determine at least one hysteretic property of battery 110 and may determine the first period of time based on the at least one hysteretic property of battery 110.

As shown by reference number 216, battery charger controller 150 may cause battery charger 120 to measure the voltage of battery 110 for a second time (e.g., after the first period of time). Battery charger controller 150 may determine a second voltage value associated with battery 110 by causing battery charger controller 150 to measure the voltage of battery 110 (e.g., by causing battery charger 120 to activate, measure the voltage of battery 110, and send a voltage measurement to battery charger controller 150). As shown by reference number 218, battery charger controller 150 may determine whether the second voltage value satisfies the voltage value threshold. For example, battery charger controller 150 may determine whether the second voltage value associated with battery 110 is greater than or equal to the maximum operating voltage value of battery 110. When the battery charger controller 150 determines that the second voltage value associated with battery 110 does not satisfy the voltage value threshold (e.g., the second voltage value of battery 110 is less than the maximum operating voltage value of battery 110), battery charger controller 150 may cause battery charger 120 to resume charging of battery 110 (e.g., as shown by reference number 206).

As shown by reference number 220, when battery charger controller 150 determines that the second voltage value associated with battery 110 satisfies the voltage value threshold (e.g., the second voltage value associated with battery 110 is greater than or equal to the maximum operating voltage value of battery 110), battery charger controller 150 may cause voltage pulse charging of battery 110 to pause for a second period of time (e.g., greater than 60 seconds and less than or equal to 240 seconds). Battery charger controller 150 may cause voltage pulse charging of battery 110 to pause for the second period of time by causing battery charger 120 to deactivate for the second period of time. The second period of time may be greater than the first period of time (e.g., the second period of time may be a multiple of the first period of time). Battery charger controller 150 may determine the second period of time based on the first period of time (e.g., battery charger controller 150 may calculate the second period of time based on the first period of time).

As shown by reference number 222, battery charger controller 150 may cause battery charger 120 to measure the voltage of battery 110 for a third time (e.g., after the second period of time). Battery charger controller 150 may determine a third voltage value associated with battery 110 by causing battery charger controller 150 to measure the voltage of battery 110 (e.g., by causing battery charger 120 to activate, measure the voltage of battery 110, and send a voltage measurement to battery charger controller 150). As shown by reference number 224, battery charger controller 150 may determine whether the third voltage value satisfies the voltage value threshold. For example, battery charger controller 150 may determine whether the third voltage value associated with battery 110 is greater than or equal to the maximum operating voltage value of battery 110. When the battery charger controller 150 determines that the third voltage value associated with battery 110 does not satisfy the voltage value threshold (e.g., the third voltage value associated with battery 110 is less than the maximum operating voltage value of battery 110), battery charger controller 150 may cause battery charger 120 to resume charging of battery 110 (e.g., as shown by reference number 206).

As shown by reference number 226, when battery charger controller 150 determines that the third voltage value associated with battery 110 satisfies the voltage value threshold (e.g., the third voltage value associated with battery 110 is greater than or equal to the maximum operating voltage value of battery 110), battery charger controller 150 may cause voltage pulse charging of battery 110 to cease. Battery charger controller 150 may cause voltage pulse charging of battery 110 to cease by causing battery 110 to disconnect from battery charger 120 (e.g., by causing battery charger 120 to activate and disconnect at least one contactor from battery 110) and/or battery charger 120 to deactivate.

Figure 3:
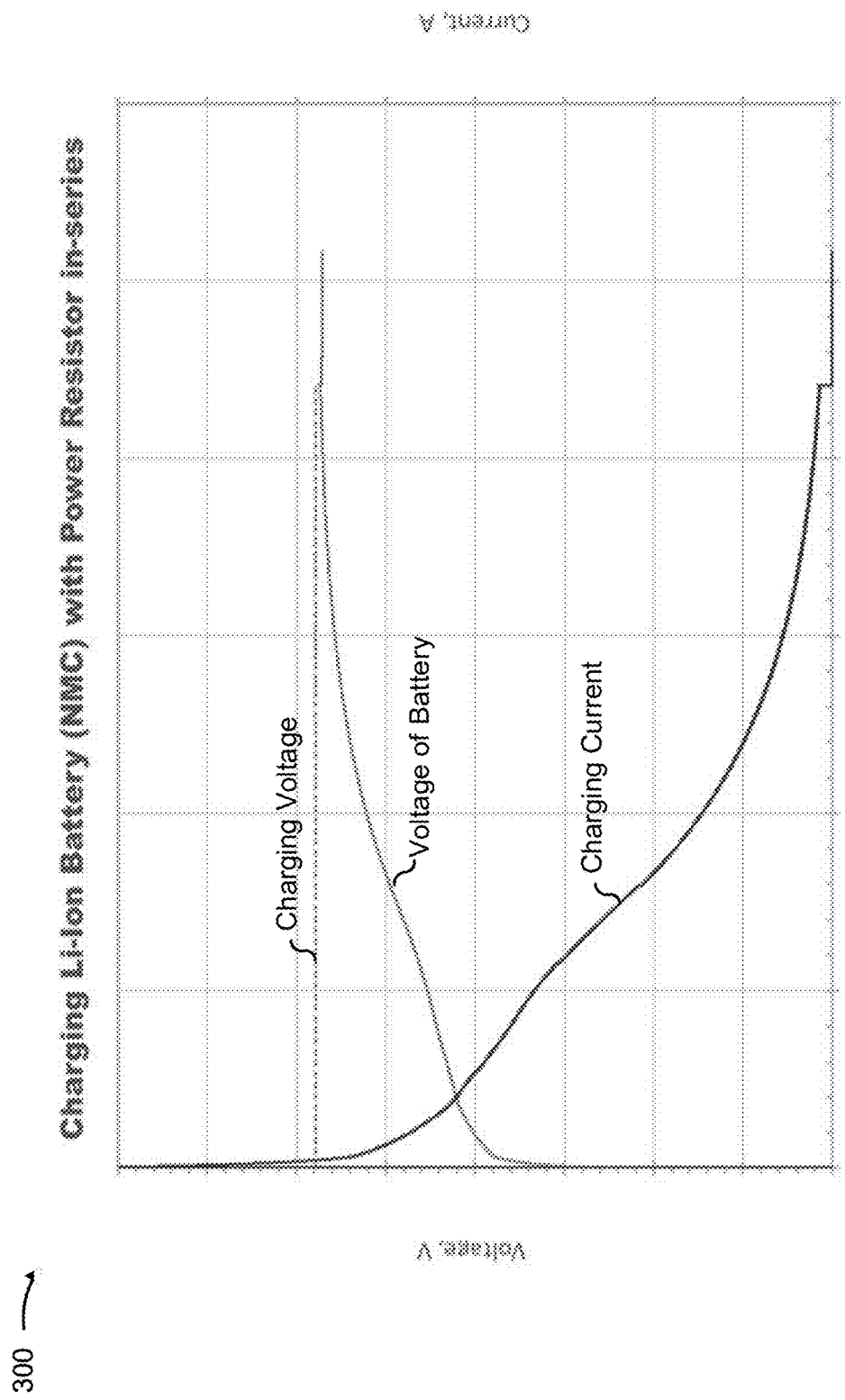
FIG. 3 is a diagram of an example graph associated with constant voltage charging as described herein.

As shown by reference number 228, battery charger controller 150 may cause battery charger 120 to measure a charging current associated with voltage pulse charging of battery 110. Battery charger controller 150 may determine a current value associated with voltage pulse charging of battery 110 by causing battery charger 120 to measure the charging current of voltage pulse charging battery 110 (e.g., by causing battery charger 120 to send a current measurement to battery charger controller 150). As shown in FIG. 3 (described herein), the charging current may have a relationship with a voltage of the battery 110.

As shown by reference number 230, battery charger controller 150 may determine an SOC value associated with battery 110 (e.g., calculate or estimate the SOC value of battery 110). Battery charger controller 150 may determine the SOC value associated with battery 110 based on the current value associated with voltage pulse charging of battery 110. Additionally, or alternatively, battery charger controller 150 may cause an external contactor of battery charger 120 or an internal contactor of the battery 110 to deactivate for a particular period of time and determine the SOC value associated with battery 110 during the particular period of time.

As shown by reference number 232, battery charger controller 150 may determine whether battery 110 is fully charged. When battery charger controller 150 determines that the SOC value associated with battery 110 satisfies a fully charged threshold (e.g., the SOC value of battery 110 is greater than or equal to 100%), battery charger controller 150 may cause voltage pulse charging of battery 110 to cease (as shown by reference number 226).

As shown by reference number 234, when battery charger controller 150 determines that the SOC value associated with battery 110 does not satisfy a fully charged threshold (e.g., the SOC value of battery 110 is less than 100%), battery charger controller 150 may determine whether the SOC value associated with battery 110 satisfies an SOC value threshold. Battery charger controller 150 may determine an optimal SOC value associated with battery 110 (e.g., an SOC value, such as 95%, that provides a sufficient charge for normal operations of battery 110) and may determine the SOC value threshold based on the optimal SOC value (e.g., the SOC value threshold may match the optimal SOC value, may match the optimal SOC value within a tolerance, such as within 3% of the optimal SOC value, and/or the like). When battery charger controller 150 determines that the SOC value associated with battery 110 does not satisfy the SOC value threshold (e.g., the SOC value associated with battery 110 is less than 95%), battery charger controller 150 may cause battery charger 120 to resume charging of battery 110 (e.g., as shown by reference number 206). When battery charger controller 150 determines that the SOC value associated with battery 110 satisfies the SOC value threshold (e.g., the SOC value associated with battery 110 is greater than or equal to 95%), battery charger controller 150 may cause voltage pulse charging of battery 110 to pause for the first period of time (e.g., as shown by reference numbers 212 and 214).

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

As indicated above, FIG. 2 is provided as an example. Other examples may differ from what is described in connection with FIG. 2.

FIG. 3 is a diagram of an example graph 300 associated with constant voltage charging, as described herein. Graph 300 is representative of a charging profile for a battery (e.g., battery 110), such as a lithium-ion battery (e.g., a lithium nickel manganese cobalt oxide (NMC) battery) that is charged by a battery charger (e.g., battery charger 120) that includes a resistor (e.g., resistor 140) in series with a power supply (e.g., power supply 130). A battery charger controller (e.g., battery charger controller 150) may cause the battery charger to charge the battery using constant voltage charging. As shown in FIG. 3, a charging voltage (e.g., a voltage setpoint value of the battery charger) remains constant while a voltage of the battery (e.g. a voltage value of the battery) increases over time. As the voltage of the battery increases, the charging current (e.g., a current value) decreases proportionally to the increase in the voltage of the battery (e.g., due to a decrease in a voltage difference between the charging voltage and the voltage of the battery). In this way, the battery charger can charge the battery to a voltage that is equal to the charging voltage of the battery charger. This constant voltage charging technique is suitable when a maximum operating voltage value of the battery is equal to or greater than the charging voltage of the battery charger.

As indicated above, FIG. 3 is provided as an example. Other examples may differ from what is described in connection with FIG. 3.

Figure 4:
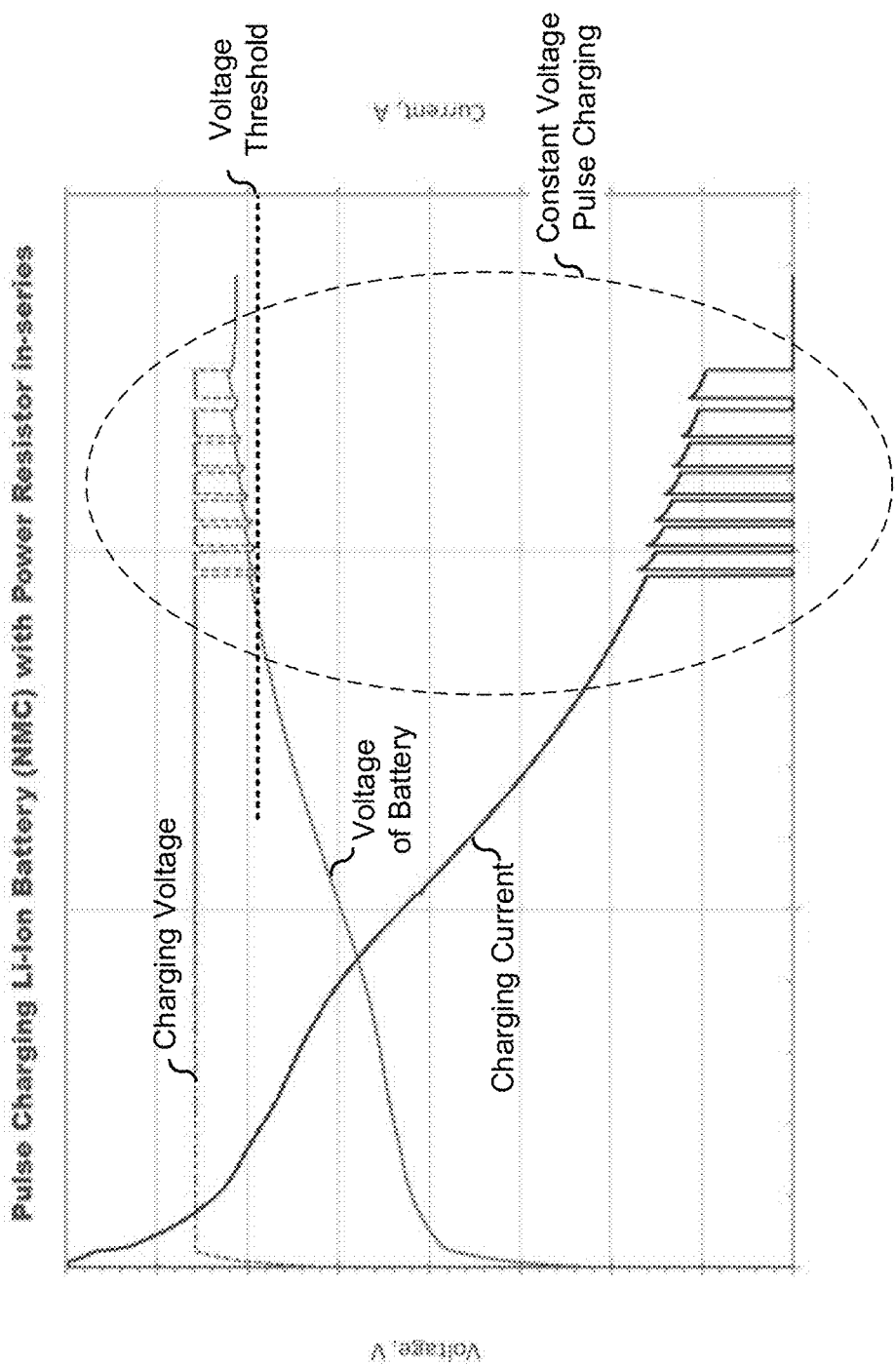
FIG. 4 is a diagram of an example graph associated with constant voltage pulse charging as described herein.

FIG. 4 is a diagram of an example graph 400 associated with constant voltage pulse charging, as described herein. Graph 400 is representative of a charging profile for a battery (e.g., battery 110), such as a lithium-ion battery (e.g., a lithium nickel manganese cobalt oxide (NMC) battery) that is charged by a battery charger (e.g., battery charger 120) that includes a resistor (e.g., resistor 140) in series with a power supply (e.g., power supply 130). A battery charger controller (e.g., battery charger controller 150) may cause the battery charger to initially charge the battery using constant voltage charging. As shown in FIG. 4, a charging voltage (e.g., a voltage setpoint value of the battery charger) remains constant while a voltage of the battery (e.g. a voltage value of the battery) increases over time. As the voltage of the battery increases, the charging current (e.g., a current value) decreases proportionally to the increase in the voltage of the battery (e.g., due to a decrease in a voltage difference between the charging voltage and the voltage of the battery).

When the voltage of the battery reaches a voltage threshold (e.g., the voltage of the battery is greater than or equal to the voltage threshold), the battery charger controller may cause the battery charger to charge the battery using constant voltage pulse charging as described herein (e.g., as discussed in relation to FIG. 2). For example, the battery charger controller may cause the battery charger to measure a voltage of the battery a first time, cause the battery charger to pause charging for a first period of time, measure the voltage of the battery a second time, cause the battery charger to pause charging for a second period of time, cause the battery charger to measure the voltage of the battery a third time, and then cause the battery charger to cease charging the battery as described herein.

In this way, the battery charger can charge the battery to a voltage level that is less than the charging voltage of the battery charger without overcharging the battery. This constant voltage pulse charging technique is suitable when a maximum operating voltage value of the battery is less than the charging voltage of the battery charger.

As indicated above, FIG. 4 is provided as an example. Other examples may differ from what is described in connection with FIG. 4.

Figure 5:
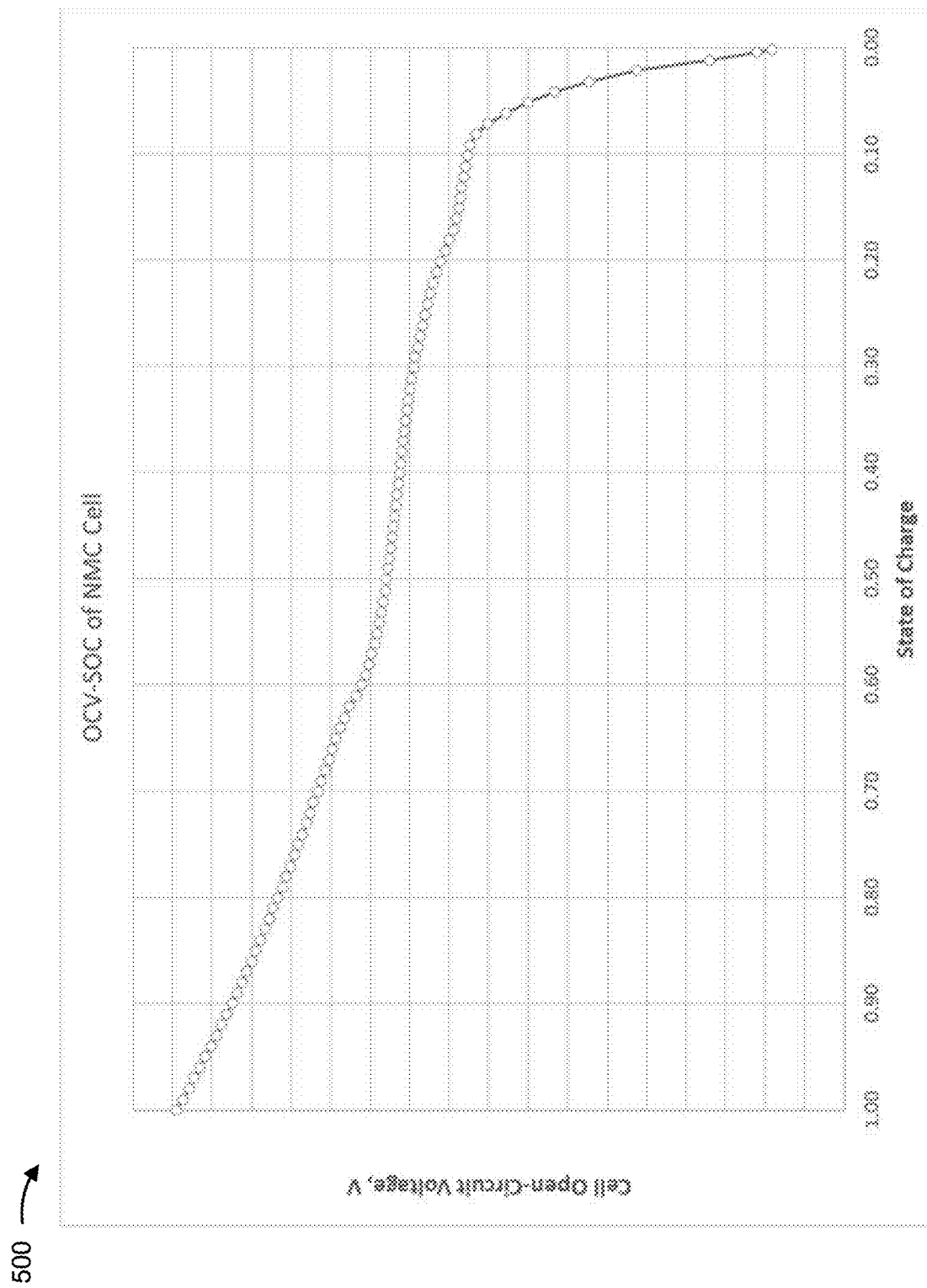
FIG. 5 is a diagram of an example graph associated with a state of charge (SOC) of a battery as described herein.

FIG. 5 is a diagram of an example graph 500 associated with a state of charge (SOC) of a battery, as described herein. Graph 500 is representative of a relationship between an open circuit voltage (OCV) of a battery (e.g., battery 110), such as a lithium-ion battery (e.g., a lithium nickel manganese cobalt oxide (NMC) battery), and an SOC of the battery. As shown in FIG. 5, the SOC of the battery has a proportional relationship with the OCV of the battery, such that high SOC values correspond to high OCV values. For example, an SOC value of 1.00 (also referred to as 100%) corresponds to a maximum operating voltage of the battery. As the battery is charged using the voltage charging techniques described herein, the SOC of the battery increases.

In some implementations, a resistance value of a resistor (e.g., resistor 140) included in a battery charger (e.g., battery charger 120) may be based on the relationship of the SOC of the battery with the OCV of the battery. For example, the resistor may have a minimum resistance value that equals a difference between a charging voltage of the battery charger and the OCV of the battery with an SOC value of 0.00 (also referred to as 0%) divided by a maximum charging current of the battery charger (e.g., $R = (V_{charging\ voltage} - V_{OCV\ at\ 0\%\ SOC}) C_{maximum\ charging\ current}$). In this way, the resistor of the battery charger may prevent the battery from being charged using a current that exceeds a maximum charging current of the battery and thereby prevent damage to the battery.

Figure 6:
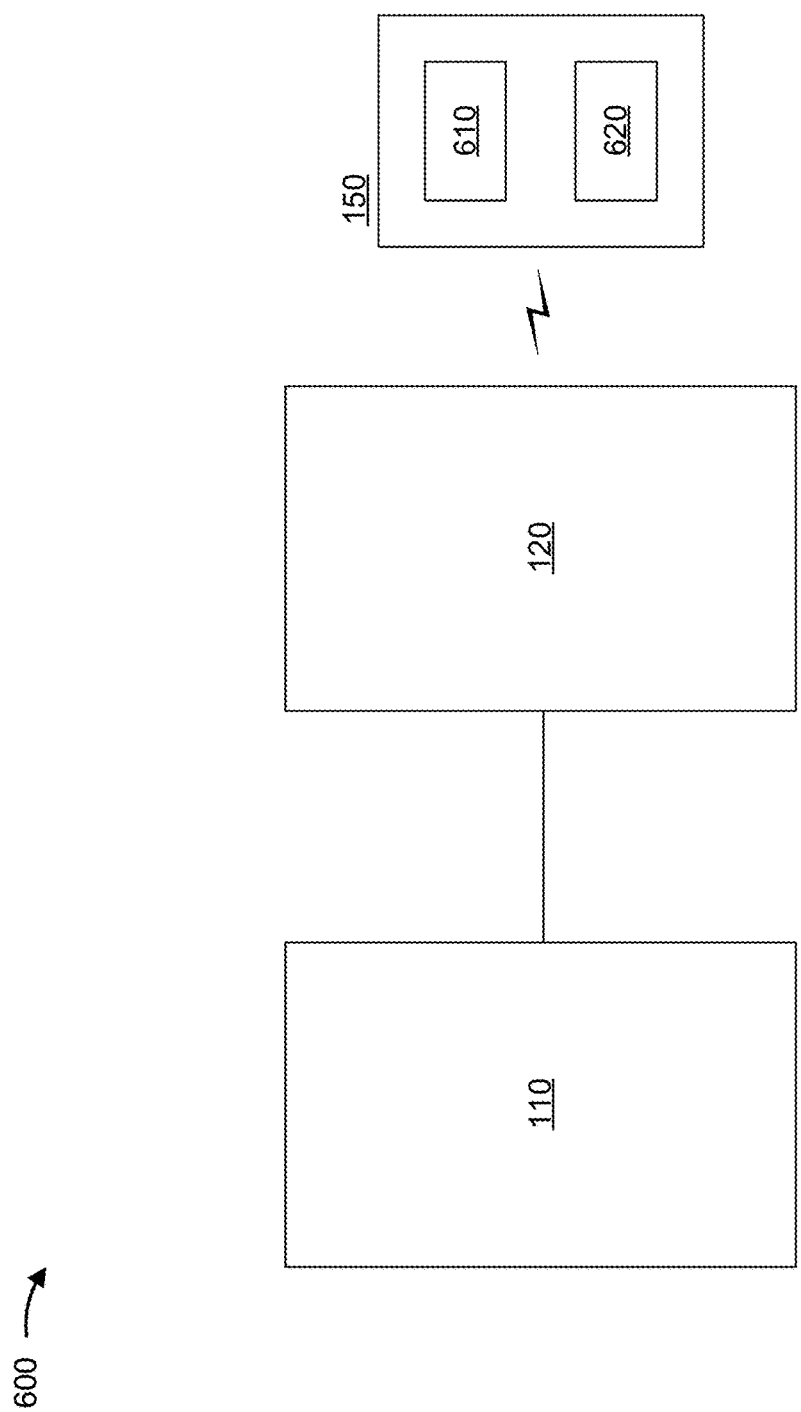
FIG. 6 is a diagram of an example environment in which systems and/or methods described herein may be implemented.

FIG. 6 is a diagram of an example environment 600 in which systems and/or methods described herein may be implemented. As shown in FIG. 6, environment 600 may include a battery 110, a battery charger 120, and a battery charger controller 150 with a processor 610 and a memory 620. Devices of environment 600 may interconnect via wired connections, wireless connections, or a combination of wired and wireless connections.

Battery 110 may include one or more devices capable of generating, storing, and/or providing energy for a power system and/or machine as described herein. Battery 110 may be a multi-cell battery and may correspond to battery 110 of FIG. 1.

Battery charger 120 may include one or more devices capable of generating, storing, converting, and/or providing energy to battery 110. For example, battery charger 120 may include a power supply to generate power that can be stored as energy within cells of battery 110. Battery charger 120 may perform one or more charging operations when battery 110 is connected to (e.g., for wired charging) terminals of battery 110 and/or when battery 110 is within a charging range of battery charger 120 (e.g., for wireless charging). Battery charger 120 may provide voltage pulse charging of battery 110. Battery charger 120 may correspond to battery charger 120 of FIG. 1.

Battery charger controller 150 includes processor 610 and memory 620. Processor 610 is implemented in hardware, firmware, and/or a combination of hardware and software.

Processor 610 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 610 includes one or more processors capable of being programmed to perform a function.

Memory 620 includes a random-access memory (RAM), a read only memory (ROM), and/or another type of dynamic or static storage device (e.g., a flash memory, a magnetic memory, and/or an optical memory) that stores information and/or instructions for use by processor 610. In some implementations, memory 620 may include and/or be communicatively coupled with a storage component that stores information and/or software related to the operation and use of battery charger controller 150. The storage component may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Battery charger controller 150 may be capable of communicating with battery charger 120 to cause battery charger 120 to begin and/or end a charging operation with battery 110. Battery charger controller 150 may cause voltage pulse charging of battery 110 by battery charger 120. Battery charger 120 may determine a first voltage value and a state of charge (SOC) value associated with battery 110. Battery charger 120 may determine whether the first voltage value satisfies a voltage value threshold and/or whether the SOC value satisfies an SOC value threshold. Battery charger controller 150 may cause, based on the first voltage value satisfying the voltage value threshold and/or the SOC value satisfying the SOC value threshold, the voltage pulse charging of battery 110 to pause for a first period of time. Battery charger controller 150 may determine, after the first period of time, a second voltage value associated with battery 110 and may determine whether the second voltage value satisfies the voltage value threshold. Battery charger controller 150 may cause, based on the second voltage value satisfying the voltage value threshold, the voltage pulse charging of battery 110 to pause for a second period of time and may determine, after the second period of time, a third voltage value associated with battery 110. Battery charger controller 150 may determine whether the third voltage value satisfies the voltage value threshold and may cause, based on the third voltage value satisfying the voltage value threshold, the voltage pulse charging of battery 110 to cease. Battery charger controller 150 may correspond to battery charger controller 150 of FIG. 1.

The number and arrangement of devices shown in FIG. 6 are provided as an example. In practice, there may be additional devices, fewer devices, different devices, or differently arranged devices than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of environment 600 may perform one or more functions described as being performed by another set of devices of environment 600.

FIG. 7 is a flow chart of an example process 700 for charging a battery. In some implementations, one or more process blocks of FIG. 7 may be performed by a battery charger controller (e.g., battery charger controller 150). In some implementations, one or more process blocks of FIG. 7 may be performed by another device or a group of devices separate from or including the battery charger controller, such as a battery (e.g., battery 110), a battery charger (e.g., battery charger 120), and/or the like.

As shown in FIG. 7, process 700 may include causing voltage pulse charging of a battery by a battery charger (block 705). For example, the battery charger controller may cause voltage pulse charging of a battery by a battery charger, as described above. The voltage pulse charging may be constant voltage pulse charging. The battery charger controller may cause the battery charger to activate to perform the constant voltage pulse charging of the battery at a voltage setpoint value that is greater than a maximum operating voltage value associated with the battery.

As further shown in FIG. 7, process 700 may include determining a first voltage value associated with the battery (block 710). For example, the battery charger controller may determine a first voltage value associated with the battery, as described above.

As further shown in FIG. 7, process 700 may include determining a state of charge (SOC) value associated with the battery (block 715). For example, the battery charger controller may determine a state of charge (SOC) value associated with the battery, as described above.

In some implementations, the battery charger controller may determine a current value associated with the voltage pulse charging of the battery and may determine the SOC value associated with the battery based on the current value. Additionally, or alternatively, the battery charger controller may cause an external contactor of the battery charger or an internal contactor of the battery to deactivate for a particular period of time and may determine the SOC value associated with battery during the particular period of time.

As further shown in FIG. 7, process 700 may include determining whether the first voltage value satisfies a voltage value threshold (block 720). For example, the battery charger controller may determine whether the first voltage value satisfies a voltage value threshold, as described above. Further, the battery charger controller may determine a maximum operating voltage value associated with the battery and may determine the voltage value threshold based on the maximum operating voltage value.

As further shown in FIG. 7, process 700 may include determining whether the SOC value satisfies an SOC value threshold (block 725). For example, the battery charger controller may determine whether the SOC value satisfies an SOC value threshold, as described above. Moreover, the battery charger controller may determine an optimal SOC value associated with the battery and may determine the SOC value threshold based on the optimal SOC value.

As further shown in FIG. 7, process 700 may include causing, based on the first voltage value satisfying the voltage value threshold or the SOC value satisfying the SOC value threshold, the voltage pulse charging of the battery to pause for a first period of time (block 730). For example, the battery charger may cause, based on the first voltage value satisfying the voltage value threshold or the SOC value satisfying the SOC value threshold, the voltage pulse charging of the battery to pause for a first period of time, as described above. Additionally, the battery charger controller may cause the battery charger to deactivate for the first period of time. The first period of time may be greater than thirty seconds and less than or equal to sixty seconds.

In some implementations, the battery charger controller may determine the first period of time based on at least one property of the battery. For example, the battery charger controller may determine at least one hysteretic property of the battery and may determine the first period of time based on the at least one hysteretic property of the battery.

As further shown in FIG. 7, process 700 may include determining, after the first period of time, a second voltage value associated with the battery (block 735). For example, the battery charger controller may determine, after the first period of time, a second voltage value associated with the battery, as described above. The battery charger controller may cause the battery charger to activate and may cause the battery charger to measure a voltage of the battery to obtain the second voltage value.

As further shown in FIG. 7, process 700 may include determining whether the second voltage value satisfies the voltage value threshold (block 740). For example, the battery charger controller may determine whether the second voltage value satisfies the voltage value threshold, as described above.

As further shown in FIG. 7, process 700 may include causing, based on the second voltage value satisfying the voltage value threshold, the voltage pulse charging of the battery to pause for a second period of time (block 745). For example, the battery charger controller may cause, based on the second voltage value satisfying the voltage value threshold, the voltage pulse charging of the battery to pause for a second period of time, as described above. Additionally, the battery charger controller may cause the battery charger to deactivate for the second period of time.

In some implementations, the second period of time may be greater than the first period of time and/or may be greater than sixty seconds and less than or equal to two hundred forty seconds. The battery charger controller may determine the second period of time based on the first period of time.

As further shown in FIG. 7, process 700 may include determining, after the second period of time, a third voltage value associated with the battery (block 750). For example, the battery charger controller may determine, after the second period of time, a third voltage value associated with the battery, as described above. The battery charger controller may cause the battery charger to activate and may cause the battery charger to measure a voltage of the battery to obtain the third voltage value.

As further shown in FIG. 7, process 700 may include determining whether the third voltage value satisfies the voltage value threshold (block 755). For example, the battery charger controller may determine whether the third voltage value satisfies the voltage value threshold, as described above.

As further shown in FIG. 7, process 700 may include causing, based on the third voltage value satisfying the voltage value threshold, the voltage pulse charging of the battery to cease (block 760). For example, the battery charger controller may cause, based on the third voltage value satisfying the voltage value threshold, the voltage pulse charging of the battery to cease, as described above. To do so, the battery charger controller may cause the battery charger to deactivate and/or the battery to disconnect from the battery charger. For example, to cause the battery to disconnect from the battery charger, the battery charger controller may cause the battery charger to activate, may cause the battery charger 120 to disconnect one or more contactors from the battery, and may cause the battery charger to deactivate.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

INDUSTRIAL APPLICABILITY

In some instances, heavy-duty machines are designed and manufactured to last for multiple years or decades. Some of these machines use batteries that need to be replaced and/or upgraded as the machines age. In some cases, a new battery is installed on a machine, and the new battery must conform with an existing battery charger. The new battery may have different characteristics than an original battery that the existing battery charger was designed to charge. For example, the new battery may have a maximum operating voltage that is lower than a setpoint voltage of the existing battery charger, which increases a likelihood that the new battery may be overcharged by the existing battery charger (e.g., by increasing a voltage of the new battery above the maximum operating voltage of the battery).

Accordingly, some implementations described herein provide a battery charger controller to control voltage pulse charging of a battery by a battery charger. In some implementations, a battery charger may determine a first voltage value and a state of charge (SOC) value associated with a battery. In some implementations, the battery charger controller may cause, based on the first voltage value satisfying a voltage value threshold and/or the value satisfying a value threshold, the voltage pulse charging of the battery to pause for a first period of time. In some implementations, the battery charger controller may determine, after the first period of time, a second voltage value associated with the battery and may cause, based on the second voltage value satisfying the voltage value threshold, the voltage pulse charging of the battery to pause for a second period of time. In some implementations, the battery charger controller may determine, after the second period of time, a third voltage value associated with the battery and may cause, based on the third voltage value satisfying the voltage value threshold, the voltage pulse charging of the battery to cease.

In this way, some implementations described herein provide a battery charger controller that can control an existing battery charger to charge a battery that has a lower maximum operating voltage than a setpoint voltage of the existing battery charger. This can decrease a likelihood of overcharging the battery, which can reduce performance degradation of the battery and/or prevent the battery from catching fire. In addition, this can extend the life of the battery and facilitate better battery performance, which can facilitate better performance of the machine that uses the battery.

What is claimed is:
1. A method, comprising:
causing, by a device, constant voltage pulse charging of a battery by a battery charger;
determining, by the device, a first voltage value associated with the battery;
determining, by the device, that the first voltage value is greater than or equal to a voltage value threshold;
causing, by the device and based on the first voltage value being greater than or equal to the voltage value threshold, the constant voltage pulse charging of the battery to pause for a first period of time;
determining, by the device and after the constant voltage pulse charging of the battery resumes after the first period of time, a second voltage value associated with the battery;

determining, by the device, that the second voltage value is greater than or equal to the voltage value threshold;

causing, by the device and based on the second voltage value being greater than or equal to the voltage value threshold, the constant voltage pulse charging of the battery to pause for a second period of time;

determining, by the device and after the constant voltage pulse charging of the battery resumes after the second period of time, a third voltage value associated with the battery;

determining, by the device, that the third voltage value is greater than or equal to the voltage value threshold; and causing, by the device and based on the third voltage value being greater than or equal to the voltage value threshold, the constant voltage pulse charging of the battery to cease.

2. The method of claim 1, wherein the second period of time is greater than the first period of time.

3. The method of claim 1, further comprising:
determining at least one hysteretic property of the battery; and
determining the first period of time based on the at least one hysteretic property of the battery.

4. The method of claim 1, further comprising:
determining the first period of time based on at least one property of the battery; and
determining the second period of time based on the first period of time.

5. The method of claim 1, wherein causing the constant voltage pulse charging of the battery by the battery charger comprises:
causing the battery charger to perform the constant voltage pulse charging of the battery at a voltage setpoint value,
wherein the voltage setpoint value is greater than a maximum operating voltage value associated with the battery.

6. The method of claim 1, further comprising:
determining a maximum operating voltage value associated with the battery; and
determining the voltage value threshold based on the maximum operating voltage value.

7. The method of claim 1, wherein causing the constant voltage pulse charging of the battery to cease comprises:
determining a state of charge (SOC) value associated with the battery;
determining that the SOC value satisfies an SOC value threshold; and
causing, based on the SOC value satisfying the SOC value threshold, the battery charger to deactivate.

8. A device, comprising:
one or more memories; and
one or more processors to:
cause voltage pulse charging of a battery by a battery charger;
determine a first voltage value associated with the battery;
determine a state of charge (SOC) value associated with the battery;
determine whether the first voltage value is greater than or equal to a voltage value threshold;
determine whether the SOC value is greater than or equal to an SOC value threshold;
cause, based on the first voltage value being greater than or equal to the voltage value threshold or the SOC value being greater than or equal to the SOC value threshold, the voltage pulse charging of the battery to pause for a first period of time;
determine, after the constant voltage pulse charging of the battery resumes after the first period of time, a second voltage value associated with the battery;
determine that the second voltage value is greater than or equal to the voltage value threshold;
cause, based on the second voltage value being greater than or equal to the voltage value threshold, the voltage pulse charging of the battery to pause for a second period of time;
determine, after the constant voltage pulse charging of the battery resumes after the second period of time, a third voltage value associated with the battery;
determine whether the third voltage value is greater than or equal to the voltage value threshold; and
cause, based on the third voltage value being greater than or equal to the voltage value threshold, the voltage pulse charging of the battery to cease.

9. The device of claim 8, wherein the one or more processors, when determining the SOC value associated with the battery, are to:
determine a current value associated with the voltage pulse charging of the battery; and
determine the SOC value associated with the battery based on the current value.

10. The device of claim 8, wherein the one or more processors, when determining the SOC value associated with the battery, are to:
cause an external contactor of the battery charger or an internal contactor of the battery to deactivate for a particular period of time; and
determine the SOC value associated with battery during the particular period of time.

11. The device of claim 8, wherein the one or more processors are further to:
determine an optimal SOC value associated with the battery; and
determine the SOC value threshold based on the optimal SOC value.

12. The device of claim 8, wherein the one or more processors, when causing the voltage pulse charging of the battery to pause for the first period of time, are to:
cause the battery charger to deactivate for the first period of time.

13. The device of claim 8, wherein the one or more processors, when causing the voltage pulse charging of the battery to pause for the second period of time, are to:
cause the battery charger to deactivate for the second period of time.

14. The device of claim 8, wherein the one or more processors, when causing the voltage pulse charging of the battery to cease, are to:
cause the battery to disconnect from the battery charger; and
cause the battery charger to deactivate.

15. A system comprising:
a battery charger configured to charge a battery,
wherein the battery charger includes a power supply and a resistor electrically coupled to the power supply; and
a battery charger controller configured to:
cause the battery charger to activate to perform constant voltage pulse charging of the battery;

determine, based on causing the battery charger to activate to perform the constant voltage pulse charging of the battery, a first voltage value associated with the battery;

determine that the first voltage value is greater than or equal to a voltage value threshold;

cause, based on the first voltage value satisfying the voltage value threshold, the battery charger to deactivate for a first period of time;

determine, after the constant voltage pulse charging of the battery resumes after the first period of time, a second voltage value associated with the battery;

determine that the second voltage value is greater than or equal to the voltage value threshold;

cause, based on the second voltage value being greater than or equal to the voltage value threshold, the battery charger to deactivate for a second period of time;

determine, after the constant voltage pulse charging of the battery resumes after the second period of time, a third voltage value associated with the battery;

determine that the third voltage value is greater than or equal to the voltage value threshold; and cause, based on the third voltage value being greater than or equal to the voltage value threshold, the battery to disconnect from the battery charger.

16. The system of claim 15, wherein the first period of time is greater than thirty seconds and less than or equal to sixty seconds.

17. The system of claim 15, wherein the second period of time is greater than sixty seconds and less than or equal to two hundred forty seconds.

18. The system of claim 15, wherein the battery charger controller, when determining the second voltage value associated with the battery, is configured to:
cause the battery charger to activate; and
cause the battery charger to measure a voltage of the battery to obtain the second voltage value.

19. The system of claim 15, wherein the battery charger controller, when determining the third voltage value associated with the battery, is configured to:
cause the battery charger to activate; and
cause the battery charger to measure a voltage of the battery to obtain the third voltage value.

20. The system of claim 15, wherein the battery charger controller, when causing the battery to disconnect from the battery charger, is configured to:
cause the battery charger to activate;
cause the battery charger to disconnect one or more contactors from the battery; and
cause the battery charger to deactivate.

* * * * *